United States Patent [19]

Watrous

[11] Patent Number: 4,675,777
[45] Date of Patent: Jun. 23, 1987

[54] TEMPERATURE-RESPONSIVE CIRCUIT FOR LOAD CONTROL APPARATUS

[75] Inventor: Donald L. Watrous, Clifton Park, N.Y.

[73] Assignee: General Electric Company, Schenectady, N.Y.

[21] Appl. No.: 681,165

[22] Filed: Dec. 13, 1984

[51] Int. Cl.⁴ .................................................. H02H 5/04
[52] U.S. Cl. ..................................... 361/106; 323/236; 323/238; 323/245; 361/86; 361/103
[58] Field of Search ................................. 361/103–106, 361/24, 86; 323/245, 281, 313, 235, 236, 241, 243, 238

[56] References Cited

U.S. PATENT DOCUMENTS

| | | | |
|---|---|---|---|
| 3,488,573 | 1/1970 | Cavigelli et al. | 361/103 |
| 4,064,448 | 12/1977 | Eafock | 323/281 |
| 4,467,386 | 8/1984 | Wasson | 361/106 |
| 4,580,088 | 4/1986 | Bloomer | 323/238 |

*Primary Examiner*—J. R. Scott
*Assistant Examiner*—Jeffrey A. Gaffin
*Attorney, Agent, or Firm*—Geoffrey H. Krauss; James C. Davis, Jr.; Marvin Snyder

[57] ABSTRACT

A temperature-responsive circuit, for operation with a load-control apparatus having a control input for adjusting the magnitude of power applied to a load from a source, uses: a sensor responsive to the temperature in the vicinity of the load-control apparatus; a subcircuit for converting the temperature sensed by the sensor to the magnitude of an electrical parameter; a subcircuit for providing a reference electrical parameter having a magnitude predeterminately selected to equal the magnitude of the electrical parameter at a maximum desired temperature $T_0$; and a subcircuit for providing a control signal to the control input of the load-control apparatus responsive to a comparison between the electrical parameter and the reference electrical parameter, with the control signal having a magnitude respectively insufficient or sufficient to substantially affect the magnitude of power applied to the load if the magnitude of the electrical parameter is respectively less than or greater than the magnitude of the reference parameter. The load power is proportionally reduced if the magnitude of the electrical parameter exceeds the magnitude of the reference parameter. The gain of a comparator-amplifier may be selected to gradually decrease the power applied to the load to a preselected magnitude when a second temperature $T_1$, greater than the maximum desired temperature $T_0$ established by the reference parameter, is sensed by the sensor.

19 Claims, 4 Drawing Figures

TEMPERATURE-RESPONSIVE CIRCUIT FOR LOAD CONTROL APPARATUS

BACKGROUND OF THE INVENTION

The present invention relates to apparatus for controlling the power applied to a load from a source and, more particularly, to a novel temperature-responsive circuit for causing load control apparatus to reduce the load power when a predetermined temperature is exceeded.

It is well known that all energy-conversion apparatus is somewhat less than perfect, i.e. that the magnitude of output energy, in the desired form, is always less than the magnitude of the input energy form, with the lost energy difference typically being dissipated from the energy conversion apparatus as heat energy. For example, if the apparatus is designed to convert electrical energy to light energy, i.e. a lamp, a portion of the input electrical energy is lost as dissipated heat. The temperature produced in the vicinity of the energy converter, by this dissipated heat energy, is highly dependent upon the design of the enery-converter (the lamp), the ambient temperature, and other factors, such as lamp orientation (e.g. lamp base up or lamp base down) and the like. The dissipated heat energy problem is particularly exacerbated in loads requiring the placement of load-control electronic apparatus in close proximity to the load/dissipated heat source. For example, a lamp operating at an average voltage less than the average AC line voltage, by action of lamp power-control apparatus interposed between the AC line and the lamp itself, will typically have the electronic power-control apparatus located adjacent to the lamp base, whereby the power-control electronic apparatus is affected not only by the energy loss therein but also receives a significant portion of the heat energy dissipated by the lamp during the course of the operation of the latter. It is highly desirable to prevent the electronic control apparatus from reaching an excessive temperature, while still permitting the electronic control apparatus to maintain the functionality of the light source with minimum application restrictions. Thus, it is particularly desirable to prevent damage to the load power-control electronics while maintaining a reduced load energy (light) output especially if normal cooling is reduced or the load is improperly positioned. Similarly, it is equally desirable that the full converted-energy (light) output can be reestablished when the load power-control electronics apparatus cools to a temperature below a predetermined maximum safe operational temperature.

BRIEF SUMMARY OF THE INVENTION

In accordance with the invention, a temperatureresponsive circuit, for operation with a load-control apparatus having a control input for adjusting the magnitude of power applied to a load from a source, comprises: means for sensing the temperature in the vicinity of said loadcontrol apparatus; means for converting the temperature sensed by said sensing means to the magnitude of an electrical parameter; means for providing a reference electrical parameter having a magnitude predeterminately selected to equal the magnitude of said electrical parameter at a maximum desired temperature $T_O$; and means for providing a control signal to the control input of said load-control apparatus responsive to a comparison between said electrical parameter and said reference electrical parameter, said control signal having a magnitude insufficient to substantially affect the magnitude of power applied to said load if the magnitude of said electrical parameter is less than the magnitude of said reference parameter, said control signal having a magnitude sufficient to proportionally reduce the magnitude of said electrical power applied to said load responsive to the magnitude of electrical parameter exceeding the magnitude of said referenced parameter.

In a presently preferred embodiment, the gain of the comparator-amplifier is selected to gradually decrease the power applied to said load to a preselected minimum magnitude when a second temperature $T_1$, greater than the maximum desired temperature $T_O$ established by the reference parameter providing means, is sensed by said sensing means. Discrete and integrable embodiments are described.

Accordingly, it is an object of the present invention to provide a temperature-responsive circuit for use in load control apparatus, for reducing the power applied to the load as long as the temperature at a sensing means is greater than a predetermined temperature.

This and other objects of the present invention will become apparent upon reading of the following detailed description, when considered in conjunction with the drawings.

DETAILED DESCRIPTION OF THE INVENTION

Figure 1:
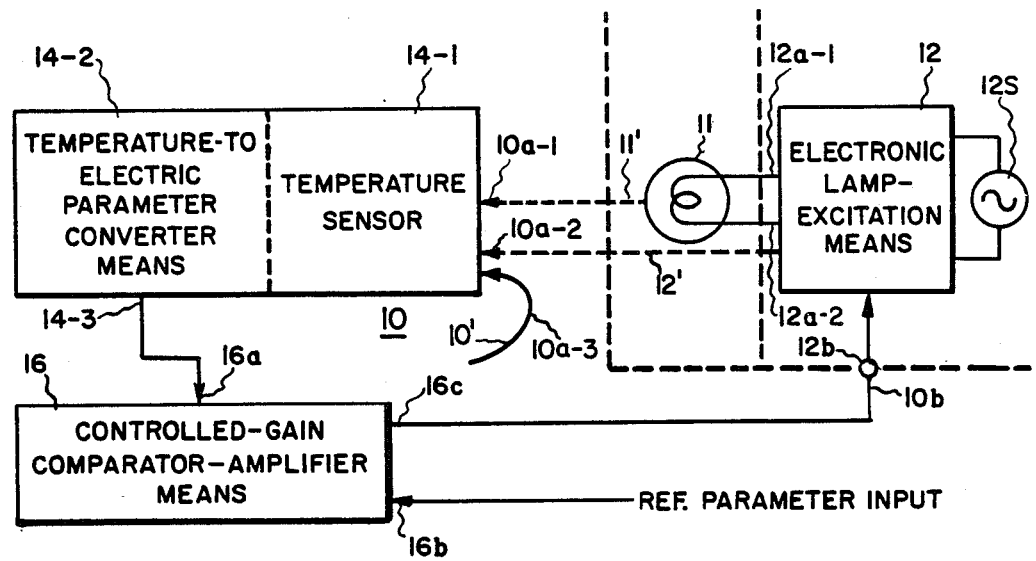
FIG. 1 is a schematic block diagram of a temperatureresponsive circuit and of a lamp load and load control apparatus with which the temperature-responsive circuit is used.

Referring initially to FIG. 1, a temperatureresponsive circuit 10 is utilized to sense the total heat energy to which some particular component or circuit element is subjected. The total heat energy may include heat energy 11' dissipated by a load 11, such as an incandescent lamp and the like; heat energy 12' dissipated by a load-control means 12, such as the illustrated electronic lampexcitation means, which provides electrical energy from an energy source 12S, such as the AC line and the like, to the controlled load connected at output terminals 12a-1 and 12a-2 responsive to the magnitude of a load-control input signal at a control input 12b; and heat energy 10' from the temperature-responsive circuit 10 itself. Thus, the temperature-responsive circuit receives thermal energy at an input 10a (actually, receives energy at three different, but not necessarily distinct, inputs 10a-1, 10a-2 and 10a-3) and provides a load-control signal at output 10b, (responsive to the total input 10a magnitude) for coupling to control input 12b.

Temperature-responsive circuit 10 comprises means 14-1, such as a temperature sensor and the like, for sensing the energy at inputs 10a (e.g. the total heat energy at all inputs 10a-1, 10a-2 and 10a-3), and associated means 14-2 operating with sensing means 14-1 for converting the sensor output to a variable magnitude of an electrical parameter, e.g. for converting the varying sensed temperature to a varying voltage magnitude. The temperature-responsive electrical parameter is provided at an output 14-3, to the first input 16a of a controlled gain comparator-amplifier means 16. Means 16 has a second input 16b, to which is applied a reference electrical parameter, e.g. a voltage, of magnitude related to the magnitude of the electrical parameter, e.g. voltage, at first input 16a when means 14-1 receives an amount of heat energy indicative of the load, control apparatus and/or adjacent volume temperature (such as the temperature in the volume occupied by excitation means 12) being at some maximum full-operation temperature $T_O$. Means output 16c provides the required control signal in such manner that normal action of means 12 occurs until the input energy 11' causes the signal at input 16a to be equal in magnitude to the reference parameter magnitude established at input 16b. Thereafter, for greater magnitudes of signals at input 16a, the output 16c signal is such that means 12 is controlled to provide decreased energy to load 11. Advantageously, the gain of means 16 is so controlled as to reduce the energy input to load 11 to a minimum if a temperature $T_1$, somewhat greater than the threshold temperature $T_O$, is attained. The action of circuit 10 is reciprocal and provides increased load power for decreasing sensed temperature above $T_O$ and below $T_1$. Thus, as load 11 is provided with, and therefore dissipates, minimum energy for sensed temperature at least equal to temperature $T_1$, the sensed temperature gradually decreases and the magnitude of the output 16c signal will gradually increase once the sensed temperature falls below the $T_1$ temperature. Load energy continues to be increased, responsive to cooling and the resulting decrease in sensed temperature, until a temperature not greater than $T_O$ is sensed, at which temperature the full input power has been restored to the load.

Figure 1A:
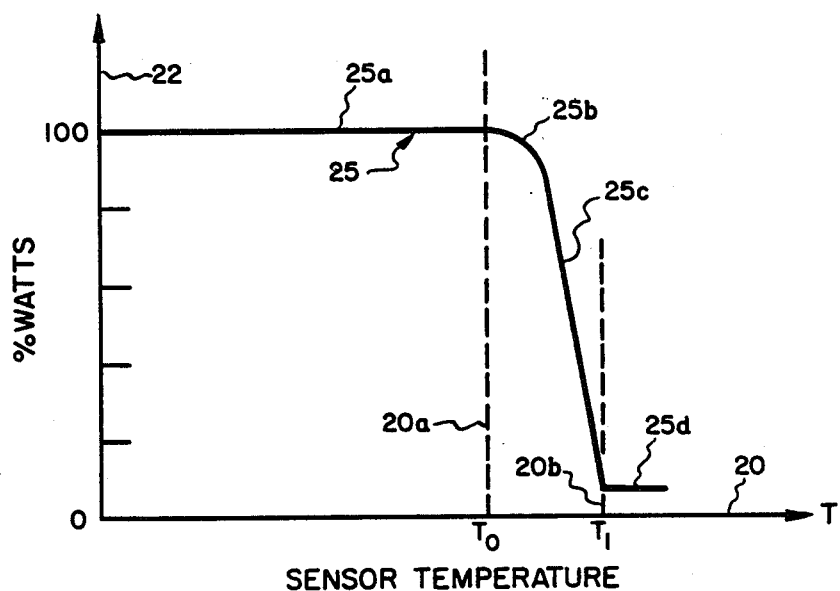
FIG. 1a is a graph illustrating the reduction in load power responsive to sensed temperature exceeding a predetermined temperature $T_O$ value.

This operation is illustrated in FIG. 1a, wherein the abscissa 20 of the graph is scaled in sensor sensed temperature T, with the desired maximum full-operational temperature $T_O$ and the "saturation" (or minimum-energy-input temperature) $T_1$ being indicated by broken lines 20a and 20b, respectively. Ordinate 22 is scaled in percent-of-maximum power (watts) for the load (lamp). Curve 25 illustrates the aforementioned action of circuit 10: for sensed temperatures T less than the desired full-operating temperature $T_O$, the load operates along portion 25a of the curve, and receives substantially full (100%) energizing power. When sensed temperature $T_O$ is exceeded, portion 25b is entered and reduction of the load power commences. For further increases in sensed temperature, portion 25c is entered and load power is gradually, and advantageously linearly, reduced to the minimum saturation level of portion 25d, before the sensed temperature exceeds saturation temperature $T_1$. Operation for temperatures decreasing, from a starting temperature in excess of $T_1$, is the reverse of the above-described increasing-temperature operation. Typical temperatures, for a particular lamp load, are $T_O$ of about 100° C. and $T_1$ of about 110° C.

Figure 2:
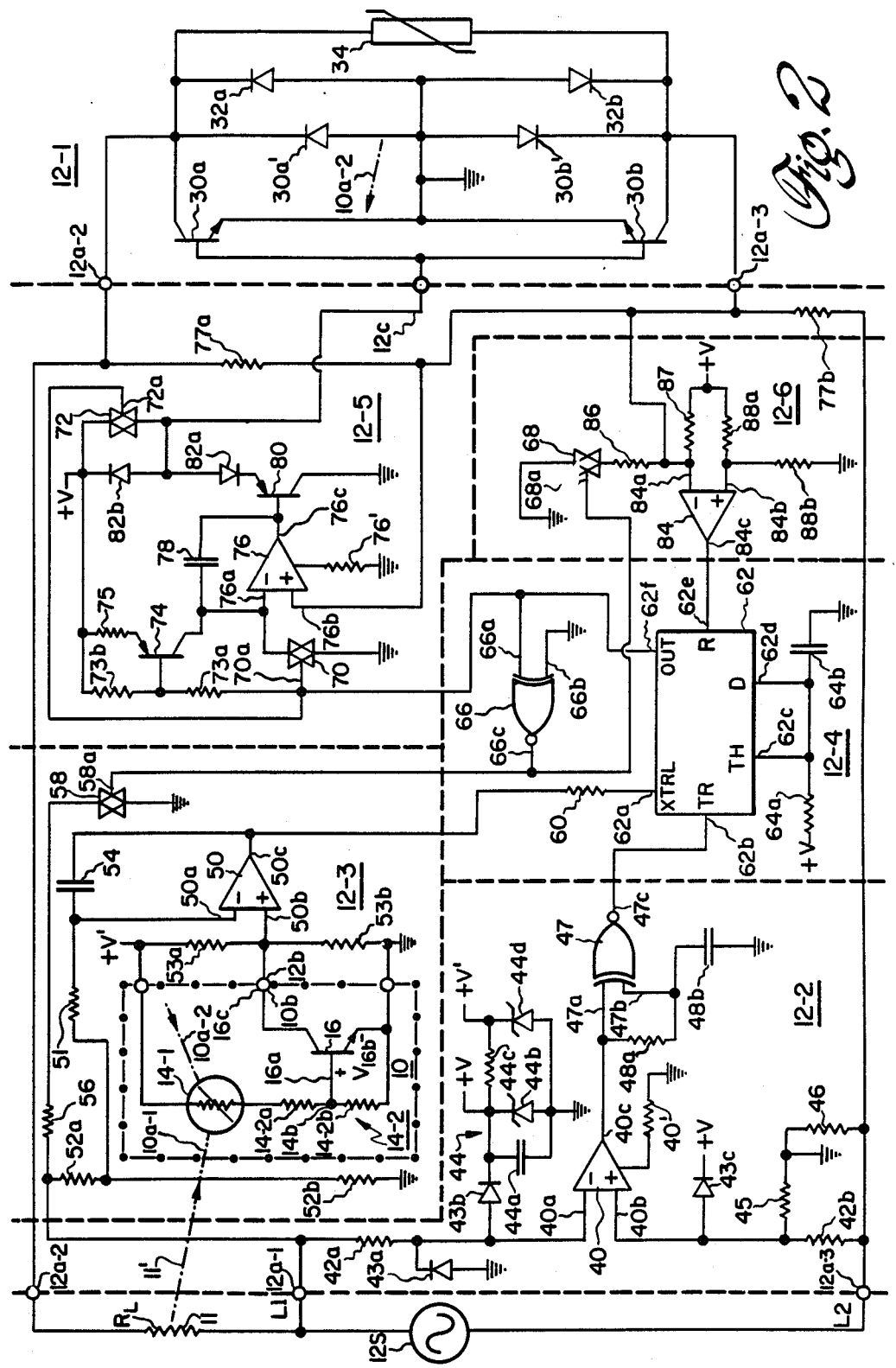
FIG. 2 is a schematic diagram of one presently preferred embodiment of a temperature-responsive circuit and of a load control circuit with which it is used.

Referring now to FIG. 2, one presently preferred temperature-responsive circuit 10 is illustrated with an associated presently-preferred load control apparatus 12 for energizing a lamp load 11 of resistance $R_L$, from an AC source 12S.

Load control apparatus 12 is more fully described and claimed in co-pending applications Ser. Nos. 499,579 and 499,590, filed May 31, 1983, now U.S. Pat. No. 4,540,893, issued Sept. 10, 1985 and U.S. Pat. No. 4,547,828 issued Oct. 15, 1985 and Ser. No. 529,296, filed Sept. 6, 1983, now U.S. Pat. No. 4,528,494, issued July 9, 1985 all assigned to the assignee of the present application and incorporated herein in their entireties by reference. Briefly, electronic lamp-excitation means 12 includes a power-switching portion 12-1 comprised of controllable power switching devices 30a and 30b, e.g. a pair of insulated-gate transistors (IGTs) having their collector-emitter circuits connected in series between the source second line terminal L2, at circuit terminal 12a-3, and that end of load 11 furthest from the first line terminal L1, and therefore at circuit terminal 12a-2. The control electrodes of both devices 30a and 30b are connected to a control terminal 12c. At least one reverse conduction diode, comprising either a parasitic diode 30a' or 30b' present in the switching device 30a or 30b, or an external unidirectionally-conducting device 32a or 32b, is utilized, as is a maximum-voltage-limiting varistor element 34. One of devices 30a or 30b is controlled into conduction at each zero crossing of the source 12S AC signal waveform, by action of a zero-crossing detector portion 12-2.

Zero-crossing detector portion 12-2 includes a comparator 40, having a setting resistance 40' associated therewith; an inverting input 40a is connected through a first resistance 42a to the first source line terminal L1, while a non-inverting input 40b is connected through another resistance 42b to the source second line terminal L2. Diodes 43a, 43b and 43c are connected, as shown, to provide both transient protection to the zero-crossing comparator 40 and to provide circuit operating voltages, in conjunction with a power supply subcircuit 44. Power supply subcircuit 44 receives the current through that one of diodes 43b or 43c then conducting, for storage in a filter capacitance 44a, up to a maximum voltage established by a first regulator element 44b (e.g. a zener diode having a zener voltage of first operating potential +V). A portion of the charge stored in capacitor 44a is provided to a second regulator circuit comprised of a series dropping resistor 44c and a second reference potential regulator, e.g. zener diode 44d, for providing a second, and lower, operating potential +V'.

A resistance 45 is coupled from the non-inverting input 40b to circuit common potential and resistor 46 is coupled from line terminal L2 to common potential, to balance the average effective resistance appearing at line terminal L1 due to another circuit portion 12-3. An exclusive-OR gate 47 has a first input 47a connected to the comparator output 40c, and a second input 47b connected to the output of a time-delay network, comprised of a delay resistance 48a and a delay capacitance 48b, such that a narrow pulse appears at the gate output 47c for each zero crossing of the source line signal waveform.

Load control portion 12-3 includes an operational amplifier 50, having an inverting input 50a connected through a series resistance 51 to the junction of an input voltage divider formed of series resistors 52a and 52b connected between line terminal L1 and circuit common potential. A non-inverting input 50b is connected to the output of a reference voltage divider 53, which output appears at the junction between a pair of series-connected resistors 53a and 53b, connected between operating potential +V' and circuit common potential. An integrating capacitance 54 is connected between input 50a and the operational amplifier output 50c. A resistance element 56 is connected between line terminal L1 and the controlled-conduction circuit of a controlled-conduction device 58, having a conduction-control input 58a. The operational amplifier output 50c is connected to one input of a conductioninterval timing control portion 12-4, and thence through a series resistance 60 to a first, XTRL, input 62a of a timer integrated circuit means. A second, TR, input 62b receives the zero-crossing detector signal from the gate output 47c. A timing resistance 64a and timing capacitance 64b are connected between operating potential +V and circuit common potential, with the junction therebetween connected to the TH and D inputs 62c and 62d, respectively, of the timer means 62. A third, R or resetting, input 62e receives a reset signal to be discussed hereinbelow. Responsive to the various input timing signals, an output 62f is switched between low and high logic levels. Output 62f is connected to one input 66a of a second exclusive-OR gate 66, having its other input 66b connected to circuit common potential. The exclusive-OR gate output 66c is connected to the conduction-control input 58a of device 58, and to the conduction-control input 68 of another controlled-conduction device 68, located in a portion 12-6 to be discussed hereinbelow.

The signal at output 62f is applied to the input of a soft-turn-off portion 12-5. This output signal appears not only at the respective control inputs 70a and 72a of a pair of controlled-conduction devices 70 and 72, respectively, but is also applied to that end of a bias resistance 73a furthest from the base electrode of a current source, or first PNP, transistor 74. A second bias resistance 73b is connected between the base electrode of transistor 74 and the source of operating potential +V; an emitter resistor 75 is connected between the emitter electrode of device 74 and operating potential +V. The collector electrode of currentsource device 74 is connected to not only the controlled-conduction circuit of device 70, but also to the inverting input 76a of another operational amplifier, having an associated setting resistance 76'. A non-inverting input 76b is coupled to the junction between a pair of sampling resistances 77a and 77b, respectively having the terminals thereof furthest from input 76b connected to terminal 12a-2 and terminal 12a-3, respectively. A controlled-turn-off time-defining capacitance 78 is connected between input 76a and the operational amplifier output 76c, which is also connected to the base electrode of a second PNP transistor 80. The collector electrode of transistor 80 is connected to circuit common potential, while the emitter electrode thereof is connected to the cathode of a first diode 82a, having its anode connected to the output device control terminal 12c. Terminal 12c is also connected to the anode of a second diode 82b, having its cathode connected to operating potential +V, with the controlled-conduction circuit of device 72 connected in parallel with diode 82b. The controlled turn-off of IGTs 30, desired to reduce EMI and the like, is dependent upon the magnitude of ramping capacitor 78 and the feedback from devices 30 through an associated one of sampling resistors 77.

The signal at the midpoint of resistors 77a and 77b is also applied to a circuit portion 12-6, which functions to turn off load current flow in the event that one or the other of output devices 30a or 30b is removed from saturation during the conduction thereof. The sampling resistance junction is connected to the inverting input 84a of another comparator 84. Input 84a is also connected through a resistance 86 to the controlled-conduction circuit of control device 68, and through another resistance element 87 to positive operating potential +V. A non-inverting comparator input 84b is connected to the output of a potential divider comprised of resistances 88a and 88b, connected between operating potential +V and circuit common potential. Comparator output 84c provides a resetting signal, to the reset R input 62e of the timing means 62, in the event that the anode voltage of either of devices 30a or 30b exceeds the level established (and defining the maximum allowable IGT "saturation" voltage) at the output of potential divider 88.

In normal operation, one of output devices 30a or 30b is turned on responsive to each source waveform zero crossing and is turned off, in a controlled manner, sometime thereafter, by the signal at output 50c, responsive to the load voltage. Circuit portion 12-3 therefore adjusts the conduction interval, during each source waveform half-cycle, to control the power applied to load 11.

In accordance with the invention, temperatureresponsive circuit 10 comprises the temperature sensor 14-1, such as a thermistor and the like variable resistance element or a semiconductor junction and the like, receiving thermal energy inputs 10a-1, 10a-2, etc. via paths 11', 12' etc. from the adjacent heat-dissipating load resistance 11, excitation means 12, etc. In particular, I prefer to locate circuit 10 close to means 12 (such as upon the above die of semiconductor material) as to provide an extremely short thermal path 12' between the means-to-be-protected (excitation means 12) and the sensor 14-1.

A resistance network, comprised of resistors 14-2a and 14-2b in series with thermistor resistance 14-1, between operating potential +V' and circuit common potential, provides the temperature-to-electrical parameter converter, which converts the sensed ambient temperature to the magnitude of the voltage at node 16a. Node 16a is also the input of the controlled gain comparator-amplifier means 16, preferably provided by transistor 16. In the present embodiment, the comparator-amplifier transistor 16 is an NPN device, having its emitter electrode connected to circuit common potential, its base electrode connected to node 16a and the output of the temperature-to-voltage conversion means, and its collector electrode connected to means output 16c, and thence to the non-inverting input 50b of operational amplifier 50, at the output node of the voltage divider 53 formed by resistances 53a and 53b. As it is desirable to be able to integrate, into a single package, the temperature-responsive circuit 10 and as much of load control apparatus 12 as possible (generally including all of load control apparatus portions 12-2 through 12-6), the reference parameter may be established by a separate reference parameter source or may be, as illustrated, provided as the voltage $V_{16b}$ across the base-emitter junction of comparator-amplifier means transistor 16. This is especially advantageous in that the base-emitter voltage $V_{16b}$ is of a magnitude known with a high degree of accuracy over the entire operating temperature range of the resulting integrated circuit containing the temperature-responsive circuit and the integrable portions of the load control apparatus.

In operation, with the components of means 12 forming an electronic load-voltage control regulator, the voltage across resistance 53b is the reference voltage for the load (lamp) voltage regulator. When thermistor temperature sensor 14-1 receives a relatively small amount of heat energy from load 11, indicative of load 11 being at a relatively low temperature, the thermistor resistance is relatively high and the voltage across converter means resistance 14-2b is relatively low and, being less than the base-emitter voltage $V_{16b}$ required for device 16 to be in the active state, does not turn on comparator-amplifier transistor 16. Accordingly, only the leakage current of transistor 16 enters terminal 16c; if the normal current flowing through reference divider 53 is much greater than this leakage current, the load reference voltage at terminal 12b remains substantially unaffected by temperature-regulating circuit 10. As the sensed temperature increases and more thermal energy is conducted along path 11' to temperature sensor input 10a, the resistance of thermistor sensing element 14-1 decreases and the voltage across converter means resistance 14-2b increases. By proper adjustment of the resistances of thermistor 14-1 and resistance elements 14-2a and 14-2b, the voltage at node 16a can be made equal to the base-emitter voltage $V_{16b}$ when the sensed temperature is essentially equal to the desired maximum full-operational temperature $T_O$. At this temperature, the node 16a voltage has increased to substantially equal voltage $V_{16b}$ and transistor 16 enters the active region and begins to conduct increasingly greater current, responsive to increasingly greater sensed temperature. Therefore, the current drawn through resistance 53a increases, reducing the reference voltage at node 12b, and therefore decreasing the time interval after each source waveform zero crossing during which one of devices 30a or 30b conducts and allows current to flow through load 11. This reduces the power applied to load 11. Therefore, the lamp voltage is reduced until thermal equilibrium is reached and the thermistor temperature is slightly above the reference temperature, by an amount inversely proportional to the closed loop gain of circuit 10, which is determined by the electrical parameters of transistor 16 and the associated resistances 14-1, 53, and 14-2. These resistances and the physical dimensions of the transistor can be so established that the transistor draws sufficient current by a temperature $T_1$ so as to reduce the voltage at node 12b to cause the device 30 current-conduction time interval to be absolutely minimal and thus reduce the load power to the minimum level (shown by portion 25d in FIG. 1a). Similarly, as the load cools and the resistance of sensor thermistor 14-1 increases, the amount of current shunted around resistance 53b, by action of transistor 16, decreases and the conduction interval, during each source waveform halfcycle, increases, unitl full load power is again applied once the load sensed temperature is below temperature $T_O$.

Figure 3:
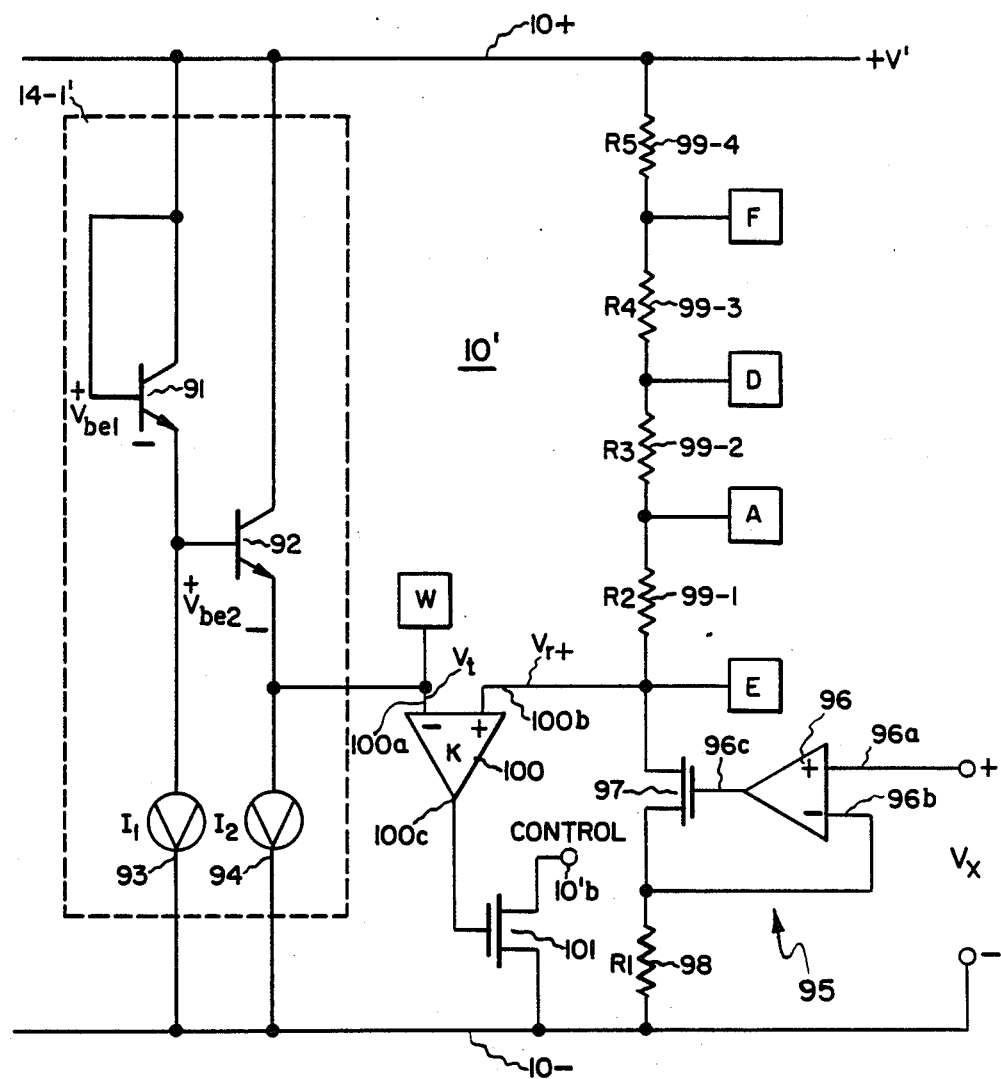
FIG. 3 is a schematic diagram of another presently preferred embodiment, which can be easily provided as a portion of an integrated-circuit load-excitation means.

Referring now to FIG. 3, one presently preferred embodiment of a temperature-responsive circuit 10' for integration with at least a portion of an excitation means in an integrated circuit, is shown. The temperature sensor 14-1' uses a pair of bipolar transistors 91 and 92, each operating at a substantial constant current $I_1$ and $I_2$, respectively, supplied by respective integrated current source means 93 or 94. At room temperature, the base-emitter voltages $V_{be1}$ and $V_{be2}$ of bipolar transistors 91 and 92 are each about 0.6 volts, with a temperature coefficient of about $-2.2$ mV/° C. The series-connected pair of sensing transistors provides a temperature-responsive voltage of $-(1.2-0.0044 \cdot T_c)$ volts, with respect to the regulated voltage $+V'$ on power supply rail 10+. Therefore, the voltage $V_5$, at test point W, is $V_t = V' - 1.2 + 0.0044(T_c)$, where $T_c$ is the temperature, in degrees Centigrade, of transistors 91 and 92. As transistors 91 and 92 (and current sources 93 and 94) can be physically close to one another on an integrated circuit die, the relative temperatures can be essentially equal and a predictable response attained.

A reference voltage $V_{r+}$ is provided by a reference subcircuit 95, which receives a stable voltage $V_x$, referenced to a negative power supply rail 10−, from a source (not shown) of type well known to the integrated circuit arts; the stable voltage $V_x$ must be translated to scaled reference voltage $V_{r+}$, which is referenced to the positive supply rail 10+, to be comparable to $V_t$. Subcircuit 95 includes an amplifier 96 having a non-inverting input 96a receiving the stable $V_x$ voltage, an inverting input 96b connected to a field-effect transistor (FET) 97 and a first resistance 98, of magnitude $R_1$, which is connected to negative or common potential rail 10−. The operational amplifier output 96c is connected to the gate electrode of FET 97, so as to force the stable voltage $V_x$ to appear across first resistor 98. The current thus caused to flow through resistance $R_1$ also flows through the channel of FET 97 and therefore through a plurality of series-connected resistors 99, e.g. the four resistors 99-1, 99-2, 99-3 and 99-4, having respective resistances $R_2$, $R_3$, $R_4$ and $R_5$. The voltage $V_{r+}$, at test point E, is now referenced to the positive rail (as necessary for comparison to the positiverail-referenced temperature-sensing signal $V_t$) and is related to the stable $V_x$ voltage, by the relationship:

$$V_{r+} = +V' - V_x(R_2+R_3+R_4+R_5)/R_1$$

Thus, the reference voltage can be changed by varying the ratio of resistances, e.g. as by connecting appropriate ones of terminals E, A, D or F, . . . to change the total resistance sum $(R_2+R_3+R_4+R_5)$, etc. While the absolute value of the resistors 98, 99-1, 99-2, 99-3 and 99-4 may vary between various integrated circuit dies, the ratio of the resistances in any one integrated circuit can be very stable, with respect to temperature-induced changes.

Another operational amplifier 100 receives the temperature-varying voltage $V_t$ at an inverting input 100a for comparison against the stable reference voltage $V_{r+}$ at a non-inverting input 100b. The amplifier output 100c is connected to the gate electrode of another FET 101, providing a control connection between rail 10− and output node 10'b. At low temperatures (i.e. less than $T_O$), voltage $V_t$ is less than voltage $=V_{r+}$ (which is set as to be equal to voltage $V_t$ at temperature $T_O$), and output 100c is at a low level, so that transistor 101 is cut-off and output 10'b is essentially an open-circuit. Therefore, excitation means 12 (see FIG. 1) operates in its full-load-power mode. As the integrated circuit temperature rises, the temperature-sensing voltage $V_t$ also rises (i.e. has less difference with respect to positive supply rail 10+). When voltage $V_t$ is substantially equal to reference voltage $V_{r+}$, the output of amplifier 100 moves into its linear region and causes transistor 101 to begin to conduct. Responsive thereto, a current (which increases as temperature increases) is drained from terminal 10'b and, therefore, from the excitation means control terminal 12b, to cause the load power to decrease. The reduction in load power (here caused by a reduction in load current) reduces the losses in the integrated excitation-sensing circuit. The load power is reduced to an amount at which the temperature of the sensor means-load excitation means remains substantially constant; if this temperature exceeds temperature $T_1$, the load is substantially turned-off. With additional cooling, the sensor means will eventually cause the excitation means to turn the load on and/or increase power in the load. The temperature range, if any, over which the amplifier 100-transistor 101 combination operates in the linear region (corresponding to the range between temperatures $T_O$ and $T_1$, in FIG. 1a) is established by the gain K of amplifier 100.

While presently preferred embodiments of my novel temperature-responsive circuit for use with load control apparatus have been described in detail herein, many variations and modifications will now become apparent to those skilled in the art. Modifications of this preferred embodiment, to cause substantially complete and sudden turn-off and/or turn-on at the desired $T_O$ temperature, or to provide a degree of hysteresis in the turn-off/turn-on temperature loop, and the like, are within the contemplated range of operation of my circuit. It is my intent, therefore, to be limited only by the scope of the appending claims and not by the specific details and instrumentalities presented by way of explanation of any presently preferred embodiment herein.

What I claim is:

1. A temperature-responsive circuit, operating with a load-control apparatus having a control input at which is adjusted the magnitude of power applied to a load from a source and having an element providing a reference for the magnitude of load voltage, comprising:

means for sensing the temperature in the vicinity of said load-control apparatus;

means for converting the temperature sensed by said sensing means to the magnitude of an electrical parameter;

means for providing a reference electrical parameter having a magnitude predeterminately selected to equal the magnitude of said electrical parameter at a maximum desired temperature To; and means, having a selected gain, for providing a control signal to the control input of said load-control apparatus responsive to a comparison between said electrical parameter and said reference electrical parameter, said control signal having a magnitude respectively insufficient and sufficient to substantially affect and proportionally reduce the magnitude of power applied to said load if the magnitude of said electrical parameter is respectively less than and greater than the magnitude of said reference electrical parameter, and said gain is selected to gradually decrease the power applied to said load to a preselected minimum magnitude when a second temperature $T_1$, greater than the desired temperature $T_O$, is sensed by said sensing means; said control-signal-providing means also having an active semiconductor device connected to said load-control apparatus element and operative to reduce said load voltage as said sensed temperature is increased above said temperature $T_O$.

2. The circuit of claim 1, wherein said sensing means is a thermistor.

3. The circuit of claim 2, wherein said converting means converts the resistance of said thermistor, responsive to sensed temperature, to the magnitude of an electrical voltage.

4. The circuit of claim 3, wherein said converting means includes: a source of operating potential; and at least one fixed resistance in an electrical series connected circuit with said thermistor between said operating potential source and a circuit common potential; the seriesconnected circuit having a node at which said voltage appears with a magnitude responsive to said sensed temperature.

5. The circuit of claim 4, wherein said reference electrical parameter is a reference voltage.

6. The circuit of claim 5, wherein said controlsignal providing means includes a single transistor.

7. The circuit of claim 6, wherein said reference voltage is the base-emitter voltage of said transistor.

8. The circuit of claim 5, wherein said reference voltage is the base-emitter voltage of a transistor.

9. The circuit of claim 3, wherein said reference electrical parameter is a reference voltage.

10. The circuit of claim 9, wherein said controlsignal providing means includes a single transistor.

11. The circuit of claim 10, wherein said reference voltage is the base-emitter voltage of said transistor.

12. The circuit of claim 1, wherein said element is a resistance and said reference is the voltage across said resistance; said active semiconductor device operating to shunt current around said reistance and reduce said reference voltage thereacross, when said sensed temperature exceeds temperature $T_O$.

13. The circuit of claim 1, wherein said sensing means is at least one semiconductor junction.

14. The circuit of claim 13, wherein said converting means converts the voltage across said at least one junction, responsive to sensed temperature, to the magnitude of a voltage varying with respect to a substantially temperature stable potential.

15. The circuit of claim 14, wherein said sensing means further includes: at least one current source, each current source connected to cause a substantially constant current to flow through an associated different one of said at least one junctions.

16. The circuit of claim 15, wherein said reference electrical parameter is a reference voltage.

17. The circuit of claim 16, wherein said control-signal providing means includes a field-effect transistor and an amplifier with a fixed gain.

18. The circuit of claim 14, wherein said reference electrical parameter is a reference voltage.

19. The circuit of claim 18, wherein said control-signal providing means includes a field-effect transistor and an amplifier with a fixed gain.

* * * * *